US006766574B2

(12) United States Patent
Mizoguchi et al.

(10) Patent No.: US 6,766,574 B2
(45) Date of Patent: Jul. 27, 2004

(54) PRODUCTION CONTROL METHOD FOR TEMPERATURE SENSOR BY ADJUSTING THICKNESS OF A HEAT-SENSING SURFACE SIDE CERAMIC LAYER

(75) Inventors: Yoshihito Mizoguchi, Aichi (JP); Takeshi Mitsuoka, Aichi (JP); Satoshi Iio, Gifu (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 09/862,613

(22) Filed: May 23, 2001

(65) Prior Publication Data

US 2002/0075129 A1 Jun. 20, 2002

(30) Foreign Application Priority Data

May 24, 2000 (JP) ...................................... 2000-152537
Dec. 5, 2000 (JP) ...................................... 2000-370395

(51) Int. Cl.[7] .............................................. H05B 3/00
(52) U.S. Cl. ........................ 29/611; 29/610.1; 29/612; 29/619; 29/620; 29/621; 338/22 R; 338/25; 338/195
(58) Field of Search .............................. 29/610.1, 611, 29/612, 620, 619, 621, 621.1; 338/22 R, 225 D, 25, 28, 34, 195

(56) References Cited

U.S. PATENT DOCUMENTS

| | | | | | |
|---|---|---|---|---|---|
| 4,041,440 | A | * | 8/1977 | Davis | 338/195 |
| 4,779,458 | A | * | 10/1988 | Mawardi | 374/41 |
| 4,818,363 | A | * | 4/1989 | Bayha et al. | 204/426 |
| 5,199,791 | A | * | 4/1993 | Kasanami et al. | 374/185 |
| 5,406,246 | A | * | 4/1995 | Friese | 338/22 R |
| 5,410,291 | A | * | 4/1995 | Kuzuoka | 338/22 R |
| 5,432,375 | A | * | 7/1995 | Agnvall | 257/467 |
| 5,600,296 | A |   | 2/1997 | Kuzuoka et al. | 338/22 |
| 5,798,685 | A | * | 8/1998 | Katsuki et al. | 338/195 |
| 5,823,680 | A |   | 10/1998 | Kato et al. | 374/185 |

FOREIGN PATENT DOCUMENTS

| | | | |
|---|---|---|---|
| JP | 6-48219 | 6/1994 | G01K/7/22 |
| JP | 7-111206 | 4/1995 | G01K/7/24 |
| JP | 7-190863 | 7/1995 | G01K/7/18 |
| JP | 9-189618 | 7/1997 | G01K/7/22 |
| JP | 9-218110 | 8/1997 | G01K/7/22 |
| JP | 11-326072 | 11/1999 | G01K/7/16 |

OTHER PUBLICATIONS

English language Abstract. JP 7111206. Apr. 25, 1995.
English language Abstract. JP 7190863. Jul. 28, 1995.
English language Abstract. JP 11326072. Nov. 26, 1999.
English language Abstract. JP 9189618. Jul. 22, 1997.
English language Abstract. JP 9218110. Aug. 19, 1997.
English language Abstract. JP 6–48219. Jun. 22, 1994.

* cited by examiner

*Primary Examiner*—Richard Chang
(74) *Attorney, Agent, or Firm*—Sughrue Mion, PLLC (57) ABSTRACT

A temperature sensor including a thermosensitive element and a ceramic body having a hollow section which surrounds the thermosensitive element airtightly. The thermosensitive element is formed on a heat-sensing surface side of the ceramic body having the hollow section. The hollow section is formed at a position which is shifted to the heat-sensing surface side with respect to the center of the temperature sensor. The ceramic body includes a heat-sensing surface side ceramic layer (1) having the thermosensitive element (4) disposed thereon, a spacer ceramic layer (3) having an aperture, and a substrate ceramic layer (2) serving as a substrate.

2 Claims, 5 Drawing Sheets

PRODUCTION CONTROL METHOD FOR TEMPERATURE SENSOR BY ADJUSTING THICKNESS OF A HEAT-SENSING SURFACE SIDE CERAMIC LAYER

BACKGROUND OF THE INVENTION

1. Field of the Invention

The present invention relates to a temperature sensor exhibiting excellent response and to a production control method therefor. More particularly, the present invention relates to a temperature sensor used for measuring the temperature of exhaust gas of a combustor or an internal combustion engine, the sensor being suitable for use at high temperature; and to a production control method for the sensor.

2. Description of the Related Art

A Pt resistor or a bulk thermistor element formed from a sintered oxide is conventionally used in a temperature sensor. However, the electrical characteristics of such a temperature sensor are easily deteriorated, by poisoning with carbon or phosphorus contained in exhaust gas or variation in partial pressure of oxygen. Therefore, when a bulk thermistor element is used, deterioration of electrical characteristics is prevented by shielding the element from the outside air by use of a glass material or a protective tube formed, for example, from stainless steel. When a Pt resistor is used, deterioration of electrical characteristics is prevented by sealing with a glass material, and the Pt resistor is formed in a certain pattern on an insulating substrate.

When a bulk thermistor element is to be used in an automobile, which produces vigorous vibration, the element is secured at a center portion of a protective tube using a filler such as cement or by means of caulking. This is to prevent breakage of the element, which occurs when the element contacts the protective tube as a result of strong vibration.

In order to effect high-speed combustion control of a combustor or an internal combustion engine, there is a need to enhance the response of a thermosensitive element. Several methods for enhancing the response of a thermosensitive element have been proposed, including a method in which the thickness of a protective tube as described above is reduced to thereby reduce, as much as possible, excess heat capacity of the tube (Japanese Patent Application Laid-Open (kokai) No. 9-189618), and a method in which the thickness of a thermosensitive element is reduced in order to enhance conductivity of heat from the outside air (Japanese Patent Application Laid-Open (kokai) No.9-218110).

3. Problems to be Solved by the Invention

In the aforementioned conventional method, since a thermistor element is protected by a layer having a relatively low thermal conductivity, such as a stainless steel layer, a glass layer, or a cement layer, a certain time elapses before heat of the exhaust gas reaches the thermistor element. Furthermore, since an air layer is present between such a layer and the thermistor element, conduction of heat to the thermistor element is lowered. Therefore, in the conventional method, it is difficult to further enhance the response of the thermistor element. Meanwhile, although a Pt resistor provided on an insulating substrate exhibits excellent response, a glass seal provided on the resistor is resistant to a temperature of up to about 600° C. Therefore, the Pt resistor is only applicable to measurement of a limited range of the temperature of exhaust gas of an internal combustion engine, which may reach 1,000° C.

Response of a thermosensitive element such as a thermistor element may be enhanced by miniaturizing the element to thereby reduce the heat capacity thereof. However, in order to obtain the desired characteristics, an electrode must be applied to the thermosensitive element with high accuracy. As a result, productivity decreases and production costs increase. Therefore, it is difficult to miniaturize the thermosensitive element.

SUMMARY OF THE INVENTION

In view of the foregoing, an object of the present invention is to provide a temperature sensor exhibiting excellent response and a production control method therefor. More particularly, an object of the present invention is to provide a temperature sensor used for measuring the temperature of exhaust gas of a combustor or an internal combustion engine, the sensor adapted for use at high temperature; and a production control method for the sensor.

The above objective has been achieved by providing a temperature sensor comprising a thermosensitive element and a ceramic body having a hollow section which surrounds the thermosensitive element in an airtight manner.

The above objective has also been achieved by providing a production control method for use in manufacturing production lots of a temperature sensor including a thermosensitive element and a ceramic body having a hollow section which surrounds the thermosensitive element in an airtight manner, the ceramic body having a substrate side and a heat-sensing surface side, and the thermosensitive element being disposed on the heat-sensing surface side of the ceramic body, which method comprises determining variation in response of the thermosensitive element among production lots in a preliminary test, and adjusting, on the basis of the results of the test, the thickness of the heat-sensing surface side ceramic layer of the ceramic body.

The following is a description of reference numerals used in the drawings.
1: heat-sensing surface side ceramic layer
2: substrate ceramic layer
3: spacer ceramic layer
31: aperture
32a, 32b: notches for lead wires
4: thermistor element
5a, 5b: electrodes
51a, 51b: electrode ends
6a, 6b: lead wires

DETAILED DESCRIPTION OF THE INVENTION

The temperature sensor of the present invention has a closed structure in which a thermosensitive element is surrounded in an airtight manner by a hollow section (i.e., void) formed inside a dense ceramic body. Therefore, poisoning of the thermosensitive element with carbon or phosphorus contained in exhaust gas can be prevented. Since the ceramic body exhibits high corrosion resistance and is not susceptible to corrosion by exhaust gas, airtightness can be maintained for a prolonged period of time. When the ceramic body is formed from a ceramic material exhibiting excellent heat resistance, the resultant temperature sensor is resistant to temperatures as high as about 1,000° C.

No particular limitation is imposed on the ceramic body, as long as the body is dense so that airtightness can be secured. Depending on the intended application of the temperature sensor, a ceramic body exhibiting an excellent characteristic such as oxidation resistance, high-temperature resistance, or high thermal conductivity is selected. Examples of ceramic materials which may be used for forming the ceramic body include alumina, mullite, spinel, aluminum nitride and silicon nitride. An oxide ceramic material can be fired simultaneously with an oxide thermistor or a Pt resistor, and a nitride ceramic material can be fired simultaneously with a carbide thermistor. Regardless of whether an oxide ceramic material or a nitride ceramic material is used, the ceramic body and the thermosensitive element can be formed by simultaneous firing, and thus production costs can be reduced.

In order to form such a closed structure in which the thermosensitive element is surrounded in an airtight manner by a hollow section formed inside the dense ceramic body, a known ceramic multi-layer lamination technique may be employed. A simultaneous firing method using ceramic green sheets, or a thick-film printing multi-layer method is preferably employed. So long as reliability or thermal conductivity is not adversely affected, the hollow section can be formed by glass bonding a plurality of ceramic members.

Examples of the material of the thermosensitive element include an NTC thermistor, a PTC thermistor, and a metallic resistor. The NTC thermistor may be formed from an oxide such as $YCrO_3$ perovskite, $MgO$—$Al_2O_3$ spinel, $Cr_2O_3$—$Al_2O_3$ corundum, or $Y_2O_3$—$ZrO_2$ fluorite; or a carbide conductive material such as SiC. The PTC thermistor may be formed from an oxide such as $BaTiO_3$ or $V_2O_5$—$Cr_2O_3$. The metallic resistor may be formed from at least one species selected from Pt, Au, Ag, Pd, Ir and Rh. In consideration of conditions for use, the resistance of the resistor can be adjusted by changing the pattern of the resistor. Since the sensor is used at high temperatures, use of a resistor predominantly containing Pt is preferred.

Among the aforementioned materials of the thermosensitive element, the PTC thermistor exhibits a sharp change in resistance at a specific temperature range, and thus temperature detection accuracy is relatively low at other temperature ranges. The metallic resistor exhibits high accuracy in temperature detection, but has low resistance output, and thus the load to a temperature detection circuit increases. Therefore, in order to conveniently detect temperature over a wide range from about 300° C. to about 1,000° C., the NTC thermistor is most preferably used.

In order to realize space savings through miniaturization of the temperature sensor, a thick film type or thin film type thermosensitive element may be used. Printing of a thick-film-type thermosensitive element is easily carried out using a known screen printing method, and the thermosensitive element may be formed by simultaneously firing with a ceramic substrate or by baking on a fired substrate. A thin film-type thermosensitive element may be formed on a fired substrate by sputtering, by a vapor phase method such as CVD, or by a liquid phase method such as dip coating.

Electrodes and lead wires for use in combination with the thermosensitive element are preferably formed of a noble metal. This is because noble metals exhibit low reactivity against oxides and carbides, and thus conductive characteristics are not impaired. Even in the case where the thermosensitive element is formed from a metallic resistor, a noble metal can be used, provided that the areas of the electrodes and the widths of the lead wires are determined so as to render the resistances of the electrodes and lead wires lower than that of the thermosensitive element. For example, the electrodes and the lead wires may be formed from at least one species selected from Pt, Au, Ag, Pd, Ir and Rh. In consideration of use at high temperatures, electrodes and lead wires predominantly containing Pt are preferred.

In the temperature sensor of the present invention, the thermosensitive element may be provided on the heat-sensing surface side of the ceramic body including the hollow section. As used herein, the term "heat-sensing surface side" refers to a side at which the ceramic body is exposed to exhaust gas of a combustor or an internal combustion engine. Between the exhaust gas and the thermosensitive element, only a heat-sensing surface side ceramic layer which is dense and has a relatively high thermal conductivity is present. Unlike a conventional bulk thermistor, in the temperature sensor of the present invention, a substance having low thermal conductivity, such as stainless steel, cement, or air, is not present between the exhaust gas and the thermosensitive element. Therefore, the heat of exhaust gas can be transmitted efficiently to the thermosensitive element.

On a side opposite the heat-sensing surface side, the vicinity of the thermosensitive element is heat-insulated by means of air in a closed chamber, and thus a heat diffusion phenomenon, namely, a phenomenon in which heat transferred to the thermosensitive element diffuses so as to reduce response, tends not to occur. Therefore, the response of the temperature sensor can be enhanced.

In the temperature sensor of the present invention, the hollow section is preferably shifted to the heat-sensing surface side with respect to the center of the temperature sensor. As used herein, the term "the center of the temperature sensor" refers to the center of the sensor in a thickness direction or in the vertical direction, provided that the surface carrying the thermosensitive element lies on a horizontal plane. When the hollow section is arranged at a position shifted toward the heat-sensing surface side, the heat-sensing surface side ceramic layer has a reduced thickness, so that heat of exhaust gas can be promptly transferred to the thermosensitive element. In addition, since the substrate ceramic layer has an increased thickness, the temperature sensor can have sufficient mechanical strength. Therefore, while the mechanical strength of the temperature sensor is secured, the thickness of the heat-sensing surface side ceramic layer can be varied in order to regulate the response.

In the temperature sensor of the present invention, the desired response can be attained by varying the thickness of the heat-sensing surface side ceramic layer and thus regulating the heat capacity of the layer. When the response of the thermosensitive element differs among production lots, a preliminary test for response is carried out in advance. On the basis of the test results, the thickness of the heat-sensing surface side ceramic layer can be varied, to thereby attain the desired response. When such a production control method is carried out, even in the case in which the response of the thermosensitive element differs among production lots, the production yield of the temperature sensor is not lowered.

Figure 1:
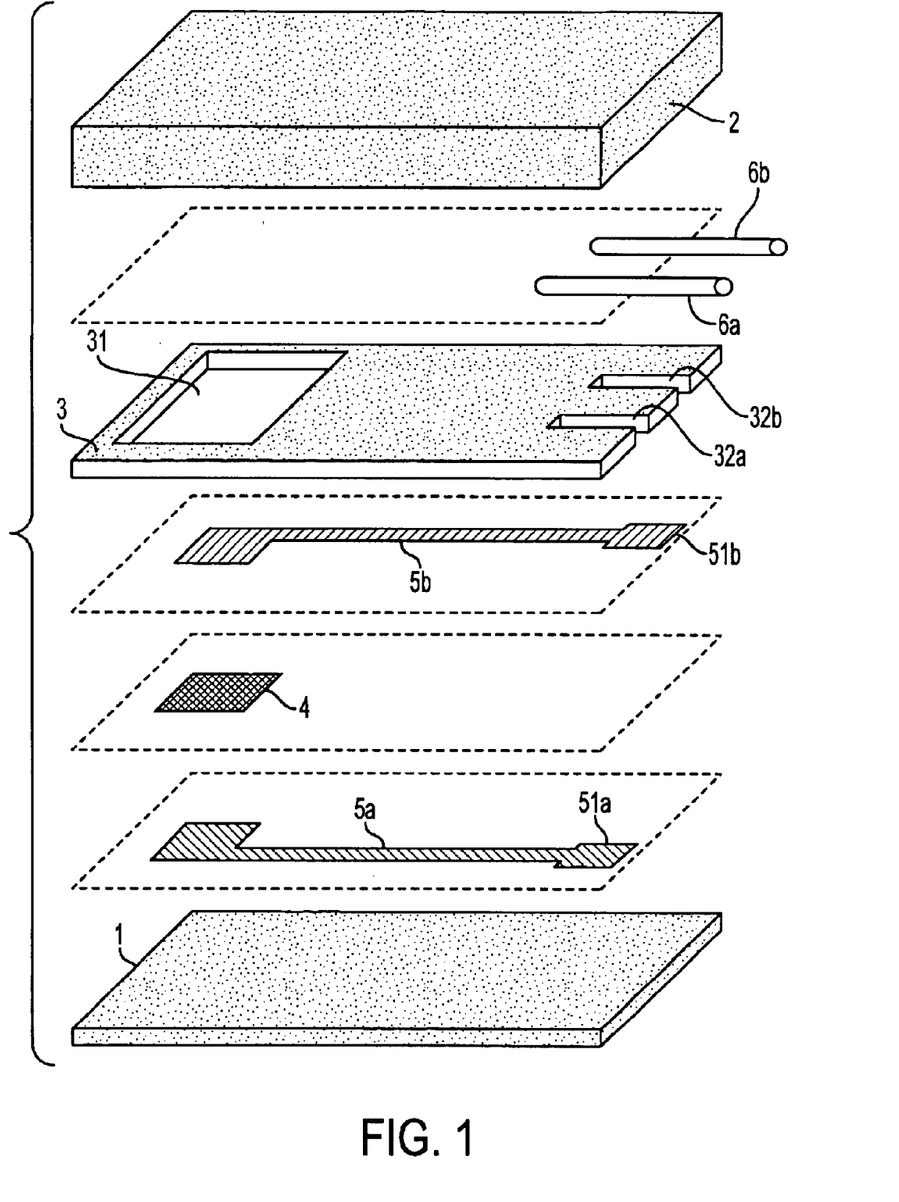
FIG. 1 is an exploded perspective view of a thick-film type thermistor according to an embodiment of the present invention.

The temperature sensor of the present invention may be formed by a known ceramic multi-layer lamination technique, including lamination of ceramic green sheets and formation of insulating paste layers by printing. For example, the temperature sensor having a structure as shown in an exploded perspective view of FIG. 1 is easily produced. This is because a ceramic body having a hollow section which surrounds a thermosensitive element (4) in an airtight manner, the ceramic body including a heat-sensing surface side ceramic layer (1), a spacer ceramic layer (3) having an aperture (31), and a substrate ceramic layer (2) serving as a substrate, can be easily produced by use of ceramic green sheets or an insulating paste.

Figure 7:
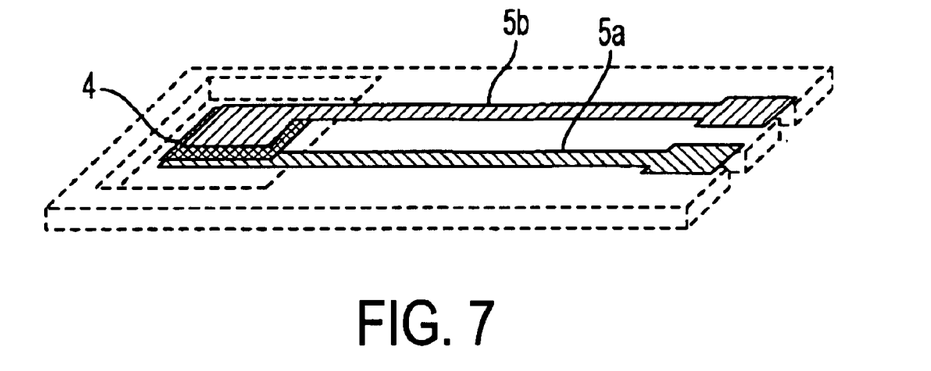
FIG. 7 is an explanatory view showing a structure in which a thermistor element is sandwiched by electrodes.

Electrodes (5a, 5b) for outputting electric signals are formed on the thermosensitive element (4). As shown in FIG. 7, the thermosensitive element is preferably sandwiched by the electrodes. This is because the amount of alkali metal or alkaline earth metal generated during firing, which diffuses from a green sheet used for the heat-sensing surface side ceramic layer to the thermosensitive element, can be reduced. Thus, deterioration of conductive characteristics can be effectively prevented. Electric signals from the thermosensitive element are output through lead wires (6a, 6b) connected to electrode ends (51a, 51b).

Figure 8:
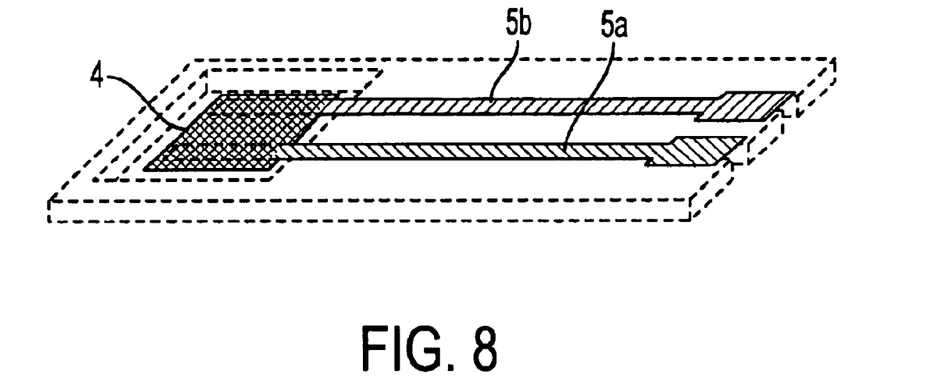
FIG. 8 is an explanatory view showing a structure in which a thermistor element bridges parallel electrodes.

When the thermosensitive element is resistant to alkali metal or an alkaline earth metal, the structure shown in FIG. 8 can be adopted, in which the thermosensitive element bridges the electrodes formed in parallel. In this case, the electrodes (5a, 5b) are formed by carrying out a single screen printing step, and thus the production steps can be advantageously reduced.

Figure 9:
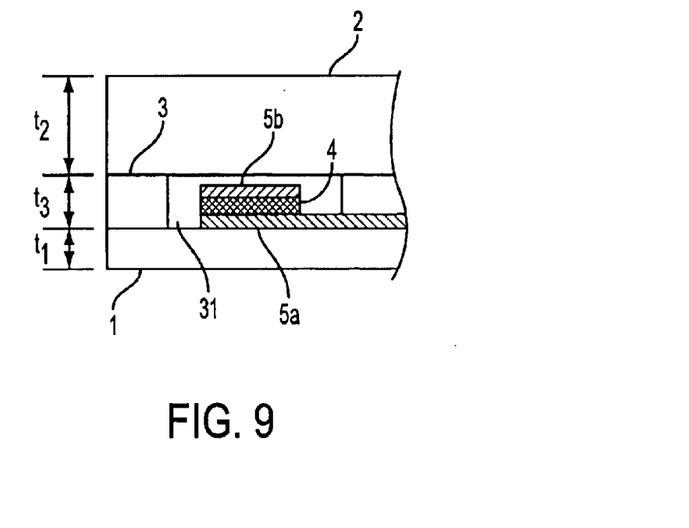
FIG. 9 is a cross-sectional view of the thermistor showing the relationship between the thickness ($t_1$) of a heat-sensing surface side ceramic layer, the thickness ($t_3$) of a spacer ceramic layer, and the thickness ($t_2$) of a substrate ceramic layer.

FIG. 9 shows the relationship between the thickness ($t_1$) of the heat-sensing surface side ceramic layer, the thickness ($t_3$) of the spacer ceramic layer, and the thickness ($t_2$) of the substrate ceramic layer, with reference to a cross-sectional view of the temperature sensor.

The thickness ($t_1$) of the heat-sensing surface side ceramic layer is 0.1–1.0 mm. This is because, when the thickness is less than 0.1 mm, cracking due to heat impact tends to occur, or the ceramic layer may be deformed during production, whereas when the thickness is in excess of 1.0 mm, response is lowered. In consideration of response, mechanical strength, and deformation, the thickness of the layer is preferably 0.1-0.9 mm, more preferably 0.1–0.6 mm.

The sum of the thickness ($t_3$) of the spacer ceramic layer and the thickness ($t_2$) of the substrate ceramic layer; i.e., ($t_2+t_3$), is 0.3–3.0 mm. This is because, when the sum is less than 0.3 mm, strength necessary for the temperature sensor cannot be secured, and thus the sensor is easily broken due to impact such as vibration, whereas when the sum is in excess of 3.0 mm, air remains between the layers during lamination to thereby form bubbles therebetween, or cracking tends to occur in the vicinity of the aperture (31) when formed by punching. In order to enhance reliability, the sum ($t_2+t_3$) is preferably 0.3–1.5 mm, more preferably 0.5–1.2 mm.

The ratio of the thickness ($t_1$) of the heat-sensing surface side ceramic layer to the sum of the thickness ($t_3$) of the spacer ceramic layer and the thickness ($t_2$) of the substrate ceramic layer; i.e., $t_1/(t_2+t_3)$, is preferably less than 1. This is because, when the thickness ($t_1$) of the heat-sensing surface side ceramic layer is rendered relatively small, the heat capacity of the ceramic layer can be reduced, to thereby enhance response of the temperature sensor. Preferably, the ratio is 0.1–0.9.

EXAMPLES

Examples of the present invention will next be described with reference to the drawings. However, the present invention should not be construed as being limited thereto.

Figure 2:
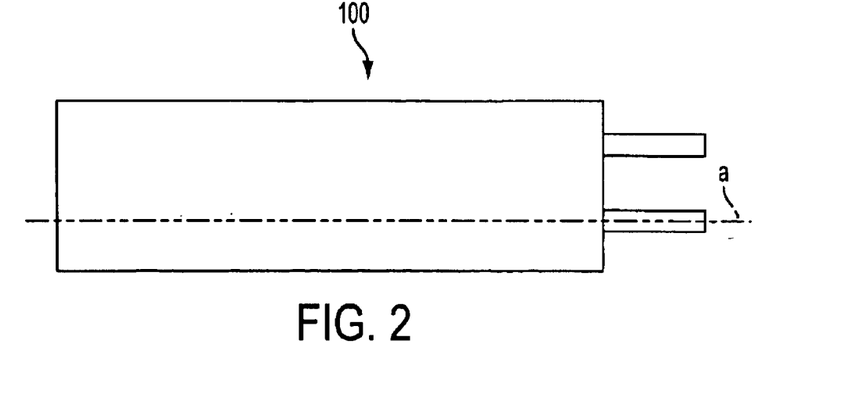
FIG. 2 is a top view of the thick-film type thermistor according to an embodiment of the present invention.

A thermosensitive element was formed from a $YCrO_3$ thermistor material, and a ceramic body was formed from $Al_2O_3$. FIG. 1 shows an exploded perspective view of a thick-film type thermistor. FIG. 2 is a top view of the thermistor. FIGS. 3 through 6 show the steps of a process for producing the thermistor in reference to cross sectional views taken along dash-dot line (a) in FIG. 2. The length and the width of the thermistor (exclusive of lead wires) are 60 mm and 5 mm, respectively. The thickness of the thermistor is determined in accordance with combinations of layers shown in Table 2.

1. Preparation of Paste for Thermistor Element $Y_2O_3$ powder, $SrCO_3$ powder, $Cr_2O_3$ powder, $Al_2O_3$ powder, $Fe_2O_3$ powder and $ZrO_2$ powder (purity of each powder: 99.9% or greater), serving as raw materials, were prepared. These powders were weighed so as to attain the proportions in wt% as reduced to oxides as shown in Table 1, placed in a resin pot together with silicon nitride grinding balls and a solvent (ethanol), and then wet-mixed therein ($SiO_2$ powder was added to the mixture in a later step). After the solvent was removed by drying, the resultant mixture was calcined in air at 1,300° C. for five hours, and then pulverized, to thereby obtain a calcined powder having a mean particle size of 1–2 μm.

To the calcined powder, $SiO_2$ powder having a mean particle size of 0.2 μm was added so as to attain the compositional proportions shown in Table 1. The resultant powder mixture was placed in a resin pot together with silicon nitride grinding balls and a solvent (ethanol), and then wet-mixed. The resultant slurry was dried at 80° C. for three hours, and then subjected to screening by use of a 250-mesh sieve, to thereby obtain granules.

A binder (ethyl cellulose) and a solvent (butylcarbitol) were added to the resultant granules, and then kneaded by use of an Ishikawa-type kneading apparatus, to thereby prepare a paste for a thermistor element.

TABLE 1

| Composition of thermistor element (wt %) | | | | | | |
|---|---|---|---|---|---|---|
| $Y_2O_3$ | SrO | $Cr_2O_3$ | $Al_2O_3$ | $Fe_2O_3$ | $ZrO_2$ | $SiO_2$ |
| 59.8 | 0.05 | 25.7 | 4.3 | 8.1 | 0.65 | 1.4 |

2. Production of Thermistor

First, ceramic green sheets, serving as a heat-sensing surface side ceramic layer (1), a spacer ceramic layer (3), and a substrate ceramic layer (2), were prepared. $SiO_2$—CaO—MgO glass (0.5 wt %) was added to alumina powder having a specific/surface area of 9.4 $m^2$/g and a mean particle size of 0.4 µm. The resultant mixture was kneaded with an acrylic binder, and then the mixture was formed into sheets using a doctor blade. Nine types of ceramic green sheets were formed so as to attain post-firing thicknesses of 0.05 mm, 0.1 mm, 0.3 mm, 0.37 mm, 0.6 mm, 0.8 mm, 0.9 mm, 1.2 mm and 1.6 mm.

Figure 3:
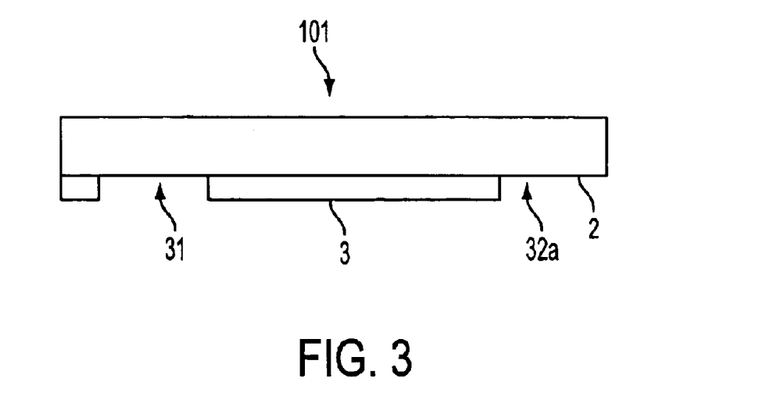
FIG. 3 is an explanatory view showing a step of a method for producing the thick-film type thermistor according to an embodiment of the present invention.
Figure 4:
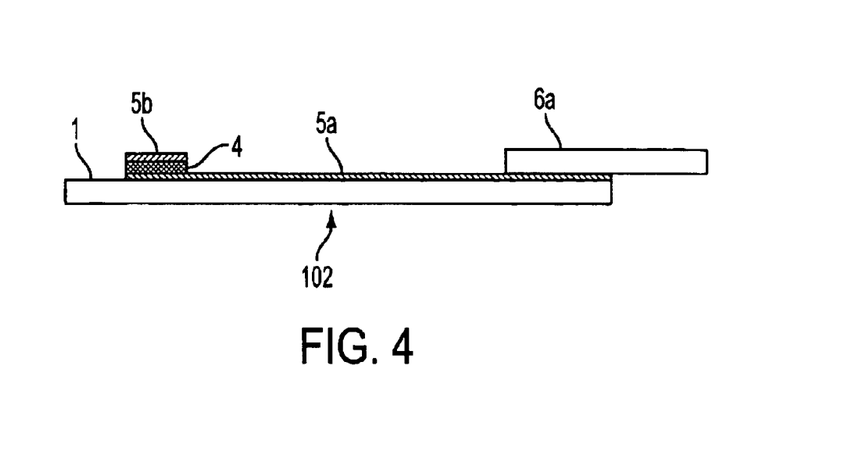
FIG. 4 is an explanatory view showing another step of the method for producing the thick-film type thermistor according to an embodiment of the present invention.

Subsequently, as shown in FIG. 3, a ceramic green sheet in which an aperture (31) and notches (32a, 32b) for lead wires were formed by punching with a die, serving as the spacer ceramic layer (3), was pressed onto a ceramic green sheet serving as the substrate ceramic layer (2), to thereby form a green body (101) including the substrate ceramic layer and the spacer ceramic layer. In this case, the ceramic green sheets were laminated so as to attain the combination of thicknesses shown in Table 2.

Subsequently, a Pt paste for forming an electrode (5a) was applied by printing in a predetermined pattern onto a ceramic green sheet serving as the heat-sensing surface side ceramic layer (1). The Pt paste was prepared as follows: a $Y_2O_3$—$Cr_2O_3$ conductive material (3 wt %) having the same composition as that of a thermistor element was added to Pt powder having a mean particle size of 0.6 µm, and then the resultant mixture was kneaded with a cellulosic binder.

The above-prepared paste for a thermistor element was applied onto the electrode (5a) by printing, and then dried. Subsequently, a Pt paste for forming an electrode (5b) was applied by printing in a predetermined pattern onto the thermistor element. Thereafter, Pt lead wires having a diameter of 0.3 mm were connected to electrode ends (51a, 51b), to thereby form a green body (102) including the heat-sensing surface side ceramic layer and the thermistor element (see FIG. 4).

Figure 5:
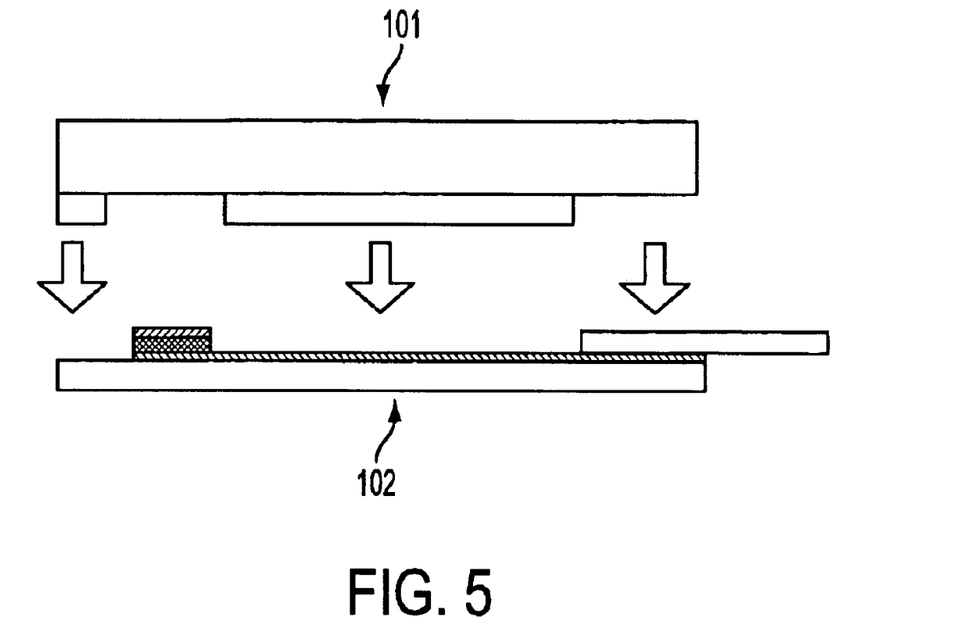
FIG. 5 is an explanatory view showing still another step of the method for producing the thick-film type thermistor according to an embodiment of the present invention.
Figure 6:
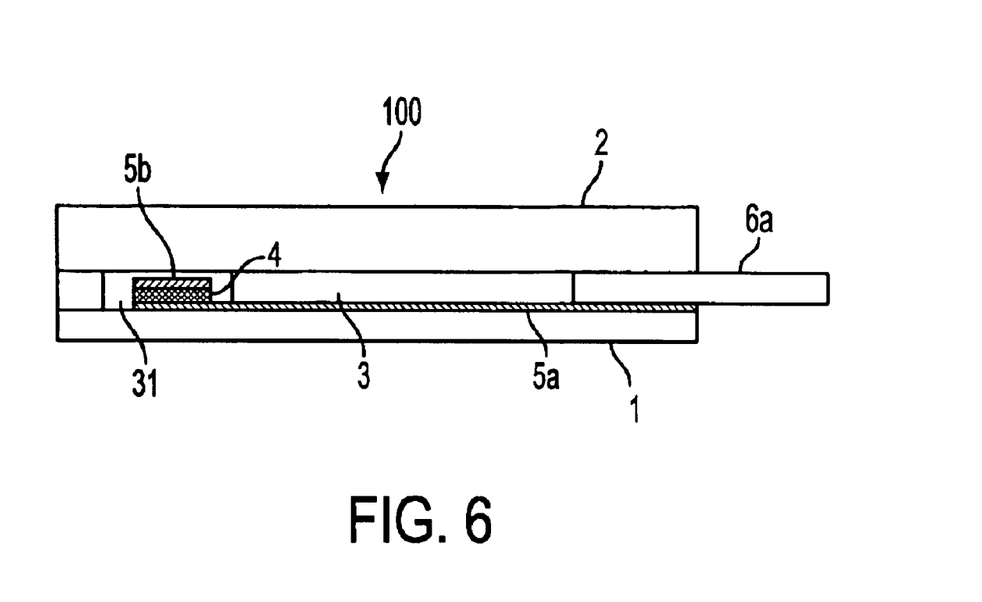
FIG. 6 is an explanatory view showing still another step of the method for producing the thick-film type thermistor according to an embodiment of the present invention.

As shown in FIGS. 5 and 6, the green body (101) including the substrate ceramic layer and the spacer ceramic layer was pressed onto the green body (102) including the heat-sensing surface side ceramic layer and the thermistor element, to thereby form a green body (100) serving as a thermistor. In this case, the ceramic green sheets were laminated so as to attain the combination of thicknesses shown in Table 2.

The dimensions of the green body (100) serving as a thermistor were adjusted by cutting such that after firing the length and the width were 60 mm and 5 mm, respectively. Subsequently, the binder was removed from the green body in air at 250° C. for six hours, to thereby obtain a degreased body. The resultant degreased body was fired in air at 1,480° C. for two hours, to thereby produce a target thermistor.

3. Evaluation of Response of Thermistor

The response of the resultant thermistor was evaluated as follows. A metallic pipe having a diameter of 30 mm was prepared and an opening was formed in the pipe. The thermistor was inserted perpendicularly into the pipe through the opening. Hot air having a temperature of 600° C. was passed through the pipe at a flow rate of 6 m/second, and the 63% response of the thermistor was measured. As used herein, the term "63% response" refers to the time when the temperature detected by the thermistor rises from room temperature to 378° C. The 63% response of the thermistor corresponding to the combination of thicknesses of the ceramic layers is shown in Table 2.

For comparison, the response of a conventional bulk thermistor was evaluated. The bulk thermistor had a structure in which a bulk thermistor element (diameter: 2 mm, height: 1.5 mm) was placed in a metallic tube (diameter: 4 mm) formed from stainless steel, and fixed with cement. The 63% response of the thermistor is shown in Table 2.

Figure 10:
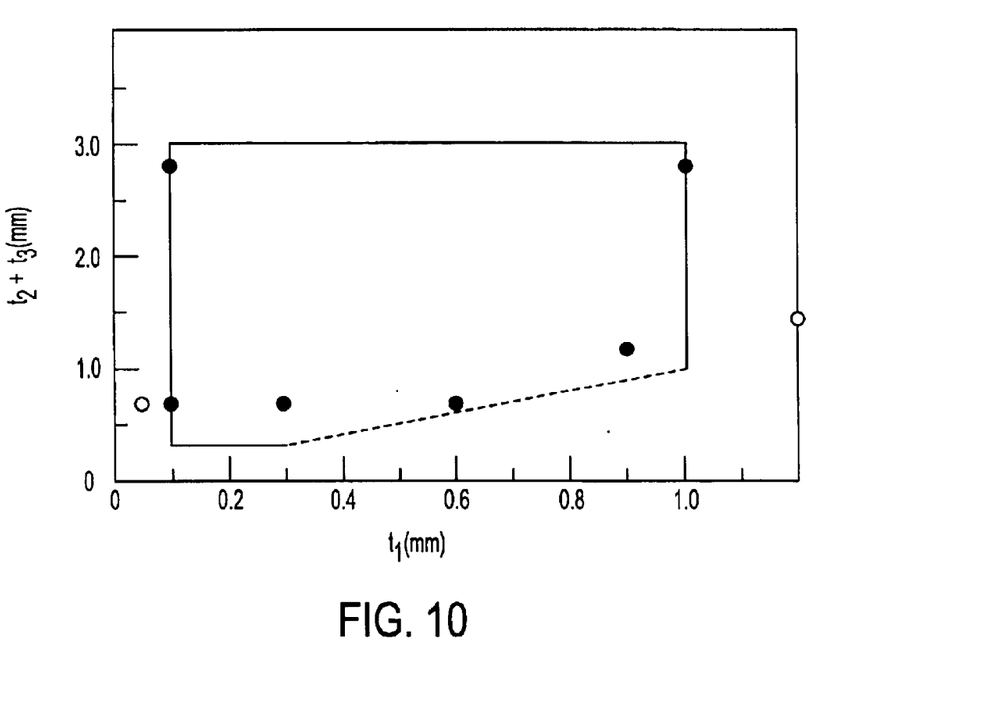
FIG. 10 is an explanatory view showing, in the form of a plot, the relationship between the thickness ($t_1$) of the heat-sensing surface side ceramic layer and the sum ($t_2+t_3$) of the thickness ($t_3$) of the spacer ceramic layer and the thickness ($t_2$) of the substrate ceramic layer in the Example of the present invention.

FIG. 10 shows, in the form of a plot, the relationship between the thickness ($t_1$) of the heat-sensing surface side ceramic layer and the sum ($t_2+t_3$) of the thickness ($t_3$) of the spacer ceramic layer and the thickness ($t_2$) of the substrate ceramic layer. The mesh-highlighted region is defined by the following (a)–(c): (a) $t_1$: 0.1–1.0 mm, (b) $t_2+t_3$: 0.3–3.0 mm, and (c) $t_1/(t_2+t_3)<1$. Note that, with respect to the relationship (c) $t_1/(t_2+t_3)<1$, the dotted line is not included in the above region.

TABLE 2

| Sample No. | Thickness of each ceramic layer (mm) | | | $(t_2 + t_3)$ (mm) | $t_1/(t_2 + t_3)$ | 63% response (seconds) |
|---|---|---|---|---|---|---|
| | $t_1$ | $t_2$ | $t_3$ | | | |
| 1 | 0.05 | 0.37 | 0.3 | 0.67 | 0.07 | Deformation |
| 2 | 0.1 | 0.37 | 0.3 | 0.67 | 0.15 | 4.6 |
| 3 | 0.1 | 1.6 | 1.2 | 2.8 | 0.04 | 4.8 |
| 4 | 0.3 | 0.37 | 0.3 | 0.67 | 0.45 | 6.1 |
| 5 | 0.6 | 0.37 | 0.3 | 0.67 | 0.90 | 8.1 |
| 6 | 0.9 | 0.8 | 0.37 | 1.17 | 0.77 | 9.9 |
| 7 | 1.0 | 1.6 | 1.2 | 2.8 | 0.36 | 10.7 |
| 8 | 1.2 | 0.8 | 0.6 | 1.4 | 0.86 | 12.5 |
| 9 | Bulk thermistor | | | | | 11.0 |

$t_1$: thickness of heat-sensing surface side ceramic layer
$t_2$: thickness of substrate ceramic layer
$t_3$: thickness of spacer ceramic layer As is apparent from Table 2, when the combination of the thicknesses of the ceramic layers falls within a preferred range of the present invention, the thermistor exhibits excellent response; i.e., the 63% response of the thermistor is 10 seconds or less. The results for Sample Nos. 2 to 4 show that the thickness of the heat-sensing surface side ceramic layer greatly effects the response of the thermistor. When such a preliminary test is carried out, and the thickness of the heat-sensing surface side ceramic layer is adjusted on the basis of the test results, variation in response among production lots can be reduced.

The thermistor, which is an embodiment of the present invention, exhibits excellent response, since, unlike the case of a conventional bulk thermistor, a substance having a low thermal conductivity, such as stainless steel or cement, is not present in a heat-conducting path. In addition, the thermistor element is hermetically disposed in the ceramic body and heat-insulated by means of air, and thus, advantageously, the element is hardly affected by heat diffusion or poisoning.

The present invention provides a temperature sensor which exhibits excellent response and which can be mass-produced at low cost.

The temperature sensor of the present invention has a hermetic structure in which a thermosensitive element is surrounded in an airtight manner by a hollow section formed inside a dense ceramic body. Therefore, poisoning of the thermosensitive element with carbon or phosphorus contained in exhaust gas can be prevented. Furthermore, since the ceramic body exhibits high corrosion resistance and is not susceptible to corrosion by exhaust gas, airtightness can be maintained for a prolonged period of time. In addition, since the ceramic body exhibits excellent heat resistance, the resultant temperature sensor is resistant to a temperature as high as about 1,000° C.

This application is based on Japanese Patent Application Nos. 2000-152537, filed May 24, 2000 and 2000-370395, filed Dec. 5, 2000, the disclosures of which are incorporated herein by reference in their entirety.

What is claimed is:

1. A production control method for use in manufacturing production lots of a temperature sensor including a thermosensitive element having at least first and second electrodes formed thereon and a ceramic body having a hollow section which surrounds the thermosensitive element in an airtight manner, said ceramic body having a substrate side layer and a heat-sensing surface side ceramic layer, and the thermosensitive element being disposed on the heat-sensing surface side layer of the ceramic body, which method comprises determining variation in response of the thermosensitive element among production lots in a preliminary test, and adjusting, on the basis of the results of the test, the thickness of the heat-sensing surface side ceramic layer of the ceramic body.

2. The production control method as claimed in claim 2, wherein said adjusting step comprises adjusting the heat transfer characteristic of the heat-sensing surface side ceramic layer.

* * * * *